(12) United States Patent
Niu et al.

(10) Patent No.: US 10,466,499 B2
(45) Date of Patent: Nov. 5, 2019

(54) DISPLAY DEVICE

(71) Applicant: Shanghai Tianma Micro-Electronics Co., Ltd., Shanghai (CN)

(72) Inventors: Lei Niu, Shanghai (CN); Jialing Li, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 15/960,840

(22) Filed: Apr. 24, 2018

(65) Prior Publication Data
US 2019/0227334 A1    Jul. 25, 2019

(30) Foreign Application Priority Data
Jan. 22, 2018   (CN) .......................... 2018 1 0058935

(51) Int. Cl.
*G02B 27/22* (2018.01)
*F21V 8/00* (2006.01)

(52) U.S. Cl.
CPC ......... *G02B 27/2292* (2013.01); *G02B 6/003* (2013.01); *G02B 6/005* (2013.01); *G02B 6/0015* (2013.01); *G02B 6/0016* (2013.01); *G02B 6/0028* (2013.01); *G02B 6/0035* (2013.01); *G02B 6/0038* (2013.01)

(58) Field of Classification Search
CPC ...... G02B 5/18; G02B 5/1814; G02B 5/1819; G02B 5/203; G02B 5/32; G02B 6/0015; G02B 6/0016; G02B 6/003; G02B 6/0035; G02B 6/0038; G02B 6/005; G02B 6/12; G02B 6/29304; G02B 6/34;
(Continued)

(56) References Cited

U.S. PATENT DOCUMENTS 6,580,529 B1 * 6/2003 Amitai .................... G02B 5/32
359/13
6,870,671 B2 * 3/2005 Travis .................... G02B 6/003
348/804
(Continued)

FOREIGN PATENT DOCUMENTS

CN    102879995 A       1/2013
CN    102928981 A  *    2/2013    ............. G02B 27/00
(Continued)

*Primary Examiner* — Daniel Petkovsek
(74) *Attorney, Agent, or Firm* — Tarolli, Sundheim, Covell & Tummino LLP (57) ABSTRACT

The present disclosure provides a display device including a display panel; a collimation unit located on a light emergent side of the display panel and configured to convert emergent light in the same position of the display panel into parallel light beams in the same direction; a light waveguide unit, which is located on one side of the collimation unit away from the display panel, includes a light incident surface and a light emergent surface opposite to the collimation unit, and is configured to cause the parallel light beams to be emergent from at least two positions of the light emergent surface; and an imaging unit opposite to the light emergent surface of the light waveguide unit and configured to converge the parallel light beams emergent from the at least two positions on the light emergent surface of the light waveguide unit into a real image point.

10 Claims, 8 Drawing Sheets

(58) Field of Classification Search
CPC ............ G02B 27/0037; G02B 27/0101; G02B 27/2292; G02B 27/42; G02B 27/4205; G02B 27/4272
See application file for complete search history.

(56) References Cited

U.S. PATENT DOCUMENTS

| | | | | |
|---|---|---|---|---|
| 8,548,290 B2* | 10/2013 | Travers | ............... | G02B 27/0081 |
| | | | | 359/34 |
| 9,400,395 B2* | 7/2016 | Travers | ............... | G02B 27/4205 |
| 9,535,253 B2* | 1/2017 | Levola | ............... | G02B 27/0172 |
| 2006/0132914 A1* | 6/2006 | Weiss | ....................... | G02B 5/32 |
| | | | | 359/462 |
| 2006/0291021 A1* | 12/2006 | Mukawa | ................... | G02B 5/32 |
| | | | | 359/15 |
| 2009/0190222 A1* | 7/2009 | Simmonds | ........... | G02B 6/0028 |
| | | | | 359/567 |
| 2010/0157400 A1* | 6/2010 | Dimov | ................... | G02B 5/188 |
| | | | | 359/13 |
| 2010/0321781 A1* | 12/2010 | Levola | ................ | G02B 27/0081 |
| | | | | 359/569 |
| 2013/0170004 A1* | 7/2013 | Futterer | ............... | G02B 6/0046 |
| | | | | 359/9 |
| 2016/0124223 A1* | 5/2016 | Shinbo | ............... | G02B 27/0101 |
| | | | | 385/37 |
| 2018/0149791 A1* | 5/2018 | Urness | ................. | G02B 6/0028 |

FOREIGN PATENT DOCUMENTS

| | | | | |
|---|---|---|---|---|
| CN | 106338832 A | | 1/2017 | |
| CN | 107505717 A | * | 12/2017 | ............. G02B 27/22 |
| JP | 2015105990 A | * | 6/2015 | ............. G02B 27/02 |

\* cited by examiner

DISPLAY DEVICE

CROSS-REFERENCE TO RELATED APPLICATIONS

The present application claims priority to Chinese Patent Application No. 201810058935.3, filed on Jan. 22, 2018, the content of which is incorporated herein by reference in its entirety.

TECHNICAL FIELD

The present disclosure relates to the field of display technologies, and in particular to a display device.

BACKGROUND

Suspension display is an optical field reconstruction display technology based on an integration imaging technology. A suspension display device consists of a lens and a large number of display units. Each display unit displays the same content. Light rays of each display unit are refracted by the lens, and the refracted light rays are superposed in the air to form a suspension image.

Since the suspension display needs many angles of view and each angle of view requires one display unit, a lot of information is on demand. For example, taking formation of the suspension image with a resolution of 40×40 as an example, the display device needs up to $40 \times 40 \times 10^4$ pixels. That is, the amount of the pixels required by the suspension display device is $10^4$ times larger than that required by a conventional display device. Neither driving nor a manufacture procedure of the suspension display device can achieve mass production and higher resolutions.

SUMMARY

Embodiments of the present disclosure provide a display device, which can more easily achieve the high-resolution suspension display.

In a first aspect, the present disclosure provides a display device. The display device includes: a display panel; a collimation unit located on a light emergent side of the display panel; and a light waveguide unit located on one side of the collimation unit away from the display panel. The collimation unit is configured to convert emergent light in a same position of the display panel into parallel light beams in a same direction. The light waveguide unit includes a light incident surface and a light emergent surface. The light incident surface is opposite to the collimation unit. The light waveguide unit is configured to cause the parallel light beams to be emergent from at least two positions on the light emergent surface. The display device further includes an imaging unit opposite to the light emergent surface of the light waveguide unit. The imaging unit is configured to converge the parallel light beams emergent from the at least two positions of the light emergent surface of the light waveguide unit into a real image point.

BRIEF DESCRIPTION OF DRAWINGS

The accompanying drawings are briefly introduced as follows. The drawings are not meant to be limiting; those skilled in the art will be able to see alternative drawings without paying creative effort.

DESCRIPTION OF EMBODIMENTS

In order to make the purpose, technical solutions, and advantages of the embodiments of the present disclosure to be clearer, the technical solutions in the embodiments of the present disclosure are clearly and completely described in the following with reference to the accompanying drawings in the embodiments of the present disclosure. Obviously, the described embodiments are merely exemplary embodiments of the present disclosure, which shall not be interpreted as limiting the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

Figure 1:
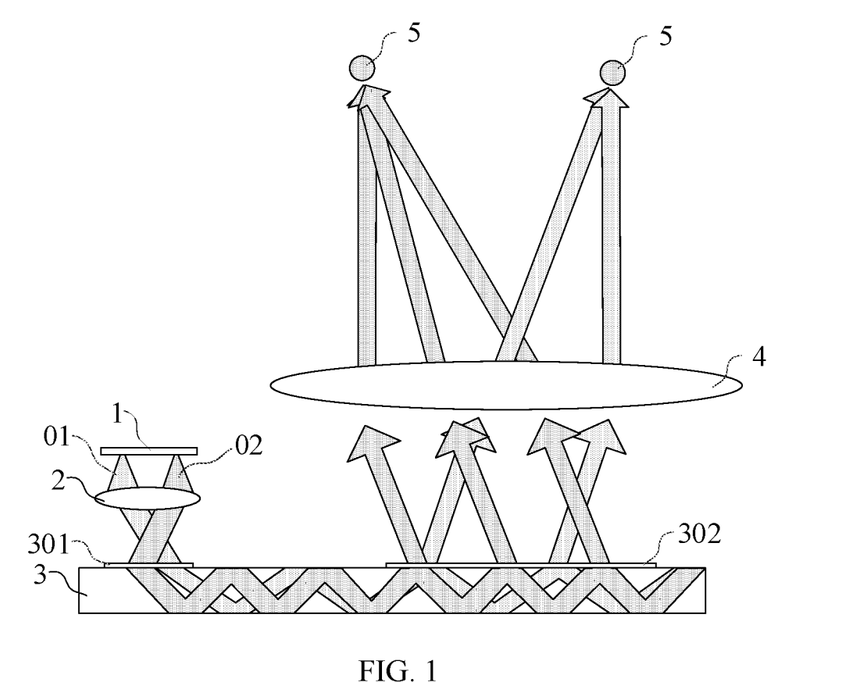
FIG. 1 is a structural schematic diagram of a display device in an embodiment of the present disclosure.

As shown in FIG. 1, FIG. 1 is a structural schematic diagram of a display device in an embodiment of the present disclosure. The embodiment of the present disclosure provides a display device, including a display panel 1; a collimation unit 2 located on a light emergent side of the display panel 1, wherein the collimation unit 2 is configured to convert emergent light in the same position of the display panel 1 into parallel light beams in the same direction; a light waveguide unit 3, located on one side of the collimation unit 2 away from the display panel 1, wherein the light waveguide unit 3 includes a light incident surface 301 and a light emergent surface 302, the light incident surface 301 is opposite to the collimation unit 2, and the light waveguide unit 3 is configured to cause the parallel light beams to be emergent from at least two positions of the light emergent surface 302; and an imaging unit 4 opposite to the light emergent surface 302 of the light waveguide unit 3, wherein the imaging unit 4 is configured to converge the parallel light beams emergent from the at least two positions of the light emergent surface 302 of the light waveguide unit 3 into a real image point 5.

For example, FIG. 1 illustrates an emergent light path of two positions in the display panel 1. The emergent light in one of the positions is defined as first emergent light 01. The emergent light in the other position is defined as second emergent light 02. The first emergent light 01 and the second emergent light 02 on the display panel 1 are both divergent light beams, and are emitted to the collimation unit 2 by a divergent light path. The collimation unit 2 is configured to convert the first emergent light 01 and the second emergent light 02 into corresponding parallel light beams respectively. The first emergent light 01 and the second emergent light 02 converged into the parallel light beams are emitted to the light incident surface 301 of the light waveguide unit 3 from the collimation unit 2, such that the light beams enter the light waveguide light 3. The first emergent light 01 and the second emergent light 02 are reflected for multiple times in the light waveguide unit 3 to be transmitted. An area of the light emergent surface 302 is larger than an area of the light incident surface 301, such that the first emergent light 01 is emergent in at least two positions of the light emergent surface 302. The first emergent light 01 is same in an emergent direction from the light emergent surface 302 and is emitted to the imaging unit 4. The second emergent light 02 is emergent in at least two positions of the light emergent surface 302. The second emergent light 02 is same in an emergent direction from the light emergent surface 302 and is emitted to the imaging unit 4. The imaging unit 4 is configured to converge the first emergent light 01 and form a corresponding real time point 5 in air, such that the second emergent light 02 is converged in air and forms the corresponding real time point 5 in air.

According to the display device in the embodiments of the present disclosure, the emergent light in the same position of the display panel is converted into the parallel light beams on the collimation unit, is emitted to the light waveguide unit, is reflected for multiple times in the light waveguide unit to be expanded to multiple positions of the light emergent surface, is emergent in the multiple positions of the light emergent surface and is emitted to the imaging unit. The imaging unit converges the light beams emergent from the multiple positions and forms a corresponding real image point in the air. That is, the light beams corresponding to the same one pixel are expanded to multiple positions in the light waveguide unit. The light beams corresponding to multiple positions are converged under an action of the imaging unit. The real image point corresponding to the same pixel is caused to correspond to the light beams of multiple different angles. In other words, the requirement of the suspension display on different angles of view is met. In this way, compared with the related art, the embodiments of the present disclosure can realize more angles of view during the suspension display with less pixels on the display panel, that is, the high-resolution suspension display is realized more simply.

Figure 2:
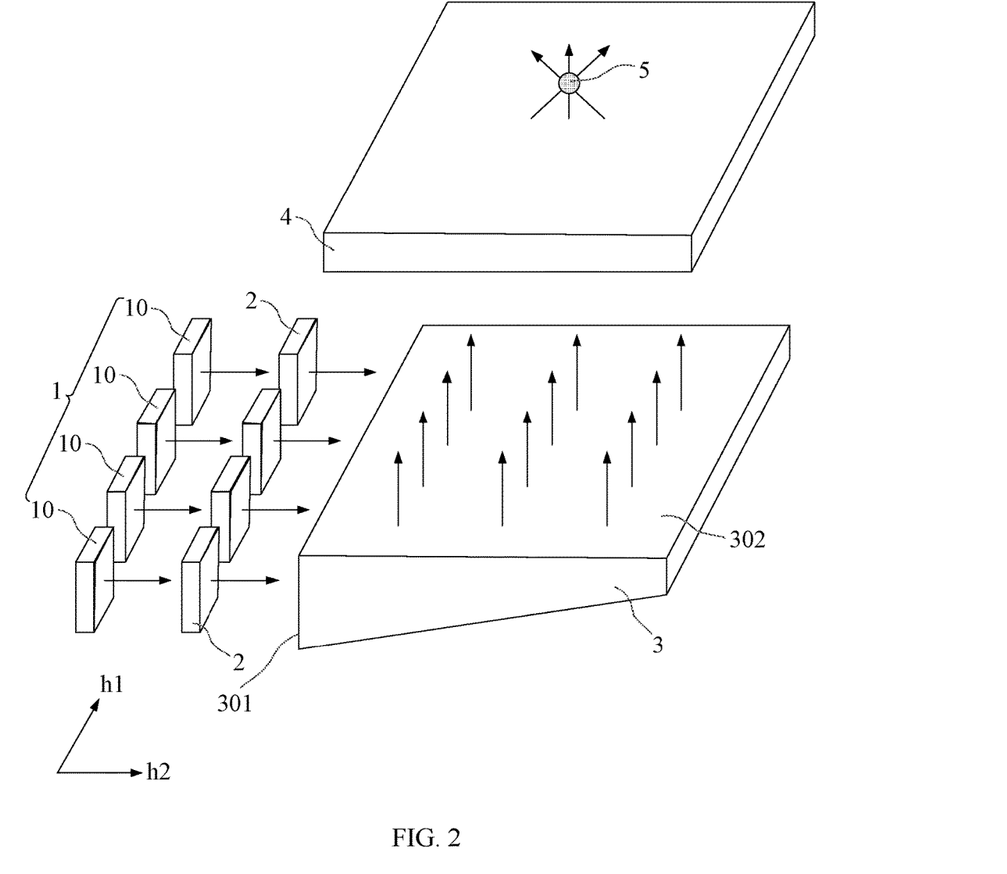
FIG. 2 is a three-dimensional structural schematic diagram of another display device in an embodiment of the present disclosure.
Figure 3:
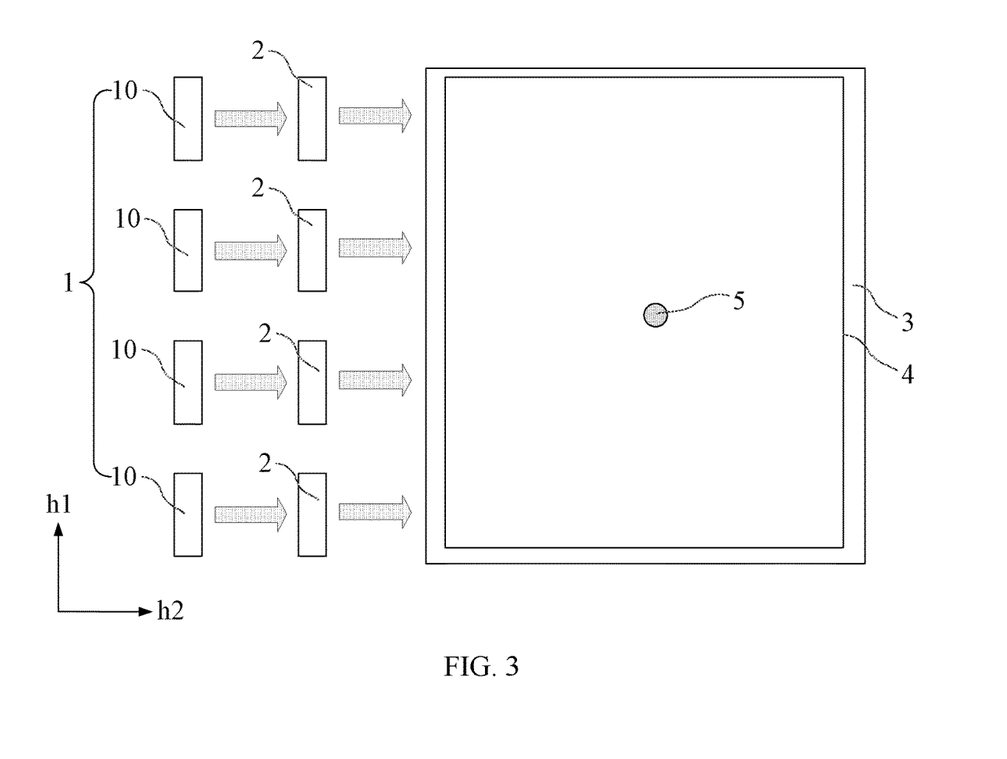
FIG. 3 is a top structural schematic diagram of part of a structure of the display device in FIG. 2.

Optionally, as shown in FIG. 2 and FIG. 3, FIG. 2 is a three-dimensional structural schematic diagram of another display device in an embodiment of the present disclosure, and FIG. 3 is a top structural schematic diagram of part of a structure of the display device in FIG. 2. The display panel 1 includes a plurality of display units 10 arranged along a first direction h1. The collimation unit 2 includes a collimation unit 2 corresponding to each display unit 10. Each collimation unit 2 is located on a light emergent side of the corresponding display unit 10. The light waveguide unit 3 is configured to cause the parallel light beams corresponding to each display unit 10 to be emergent from at least two positions arranged along a second direction h2 of the light emergent surface 302. The imaging unit 4 is configured to converge the parallel light beams corresponding to each display unit 10 into a real image point 5.

In particular, the display units 10 are configured to provide a pattern finally displayed in suspension imaging. Each display unit 10 is configured to display the same image. The plurality of display units 10 are arranged along the first direction h1, such that the image is expanded in the first direction h1. While the light waveguide unit 3 is configured to cause the emergent light of each display unit 10 to be emergent from at least two positions arranged along the second direction h2 at the light emergent surface 302, such that the image is expanded in the second direction h2. Therefore, the suspension display of higher resolution is realized with less display units.

Figure 4:
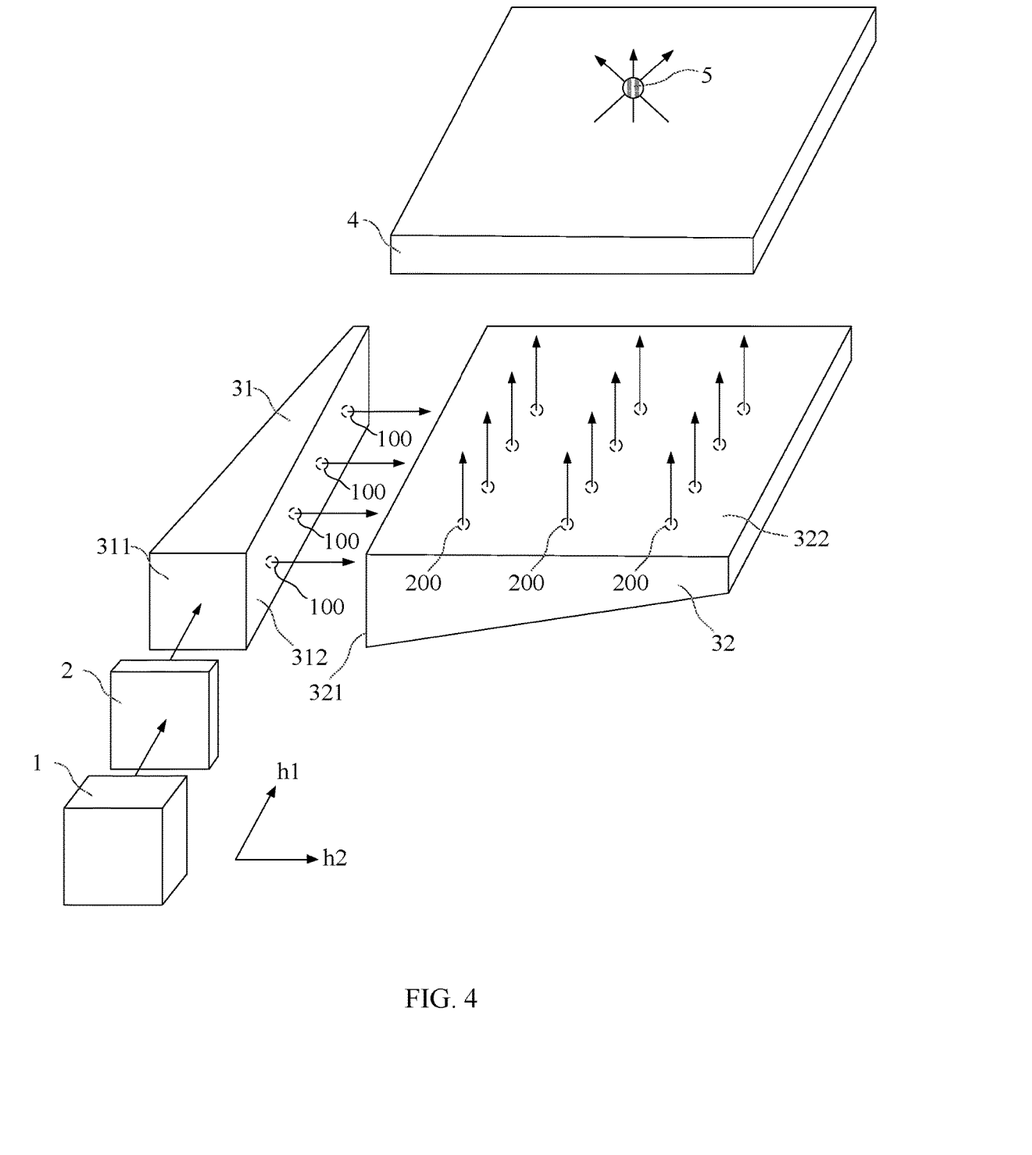
FIG. 4 is a three-dimensional structural schematic diagram of another display device in an embodiment of the present disclosure.
Figure 5:
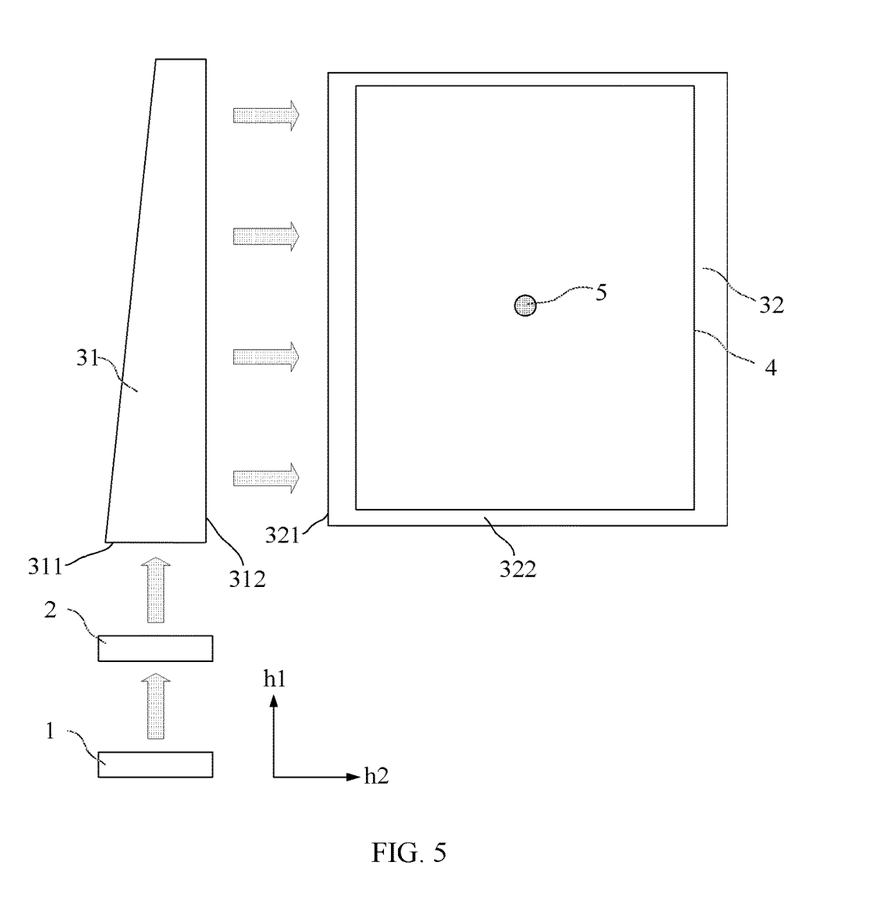
FIG. 5 is a top structural schematic diagram of part of a structure of the display device in FIG. 4.

Optionally, as shown in FIG. 4 and FIG. 5, FIG. 4 is a three-dimensional structural schematic diagram of another display device in an embodiment of the present disclosure, and FIG. 5 is a top structural schematic diagram of part of a structure of the display device in FIG. 4. The light waveguide unit includes a first light waveguide 31 and a second light waveguide 32. The first light waveguide 31 includes a first light incident surface 311 and a first light emergent surface 312. An area of the first light emergent surface 312 is larger than an area of the first light incident surface 311. The first light incident surface 311 is opposite to a light emergent side of the collimation unit 2. The first light waveguide 31 is configured to cause the parallel light beams emergent from the collimation unit 2 to be emergent from at least two first positions 100 arranged along the first direction h1 at the first light emergent surface 312. The second light waveguide 32 includes a second light incident surface 321 and a second light emergent surface 322. An area of the second light emergent surface 322 is larger than an area of the second light incident surface 321. The second light incident surface 321 is opposite to the first light emergent surface 312. The second light waveguide 32 is configured to cause the parallel light beams emergent from the first light waveguide 31 in each first position 100 to be emergent from at least two second positions 200 arranged along the second direction h2 at the second light emergent surface 322. The imaging unit 4 is configured to converge the parallel light beams emergent from the second light waveguide 32 in each second position 200 into a real image point.

In the display device as shown in FIG. 4 and FIG. 5, the display panel 1 may only include one display unit. The display unit 10 is configured to provide a pattern finally displayed in suspension imaging. The first light waveguide 31 is configured to cause the emergent light of the display panel 1 to be emergent from at least two first positions 100 arranged along the first direction h1 on the first light emergent surface 312, such that the image is expanded in the first direction h1. While the second light waveguide 32 is configured to cause the light beams emergent on the first light emergent surface 312 of the first light waveguide 31 to be emergent from at least two positions 200 arranged along the second direction h2 on the second light emergent surface 322, such that the image is further expanded in the second direction h2. Therefore, the suspension display of higher resolution is realized with less display units. Compared with the display device as shown in FIG. 2 and FIG. 3, the display device as shown in FIG. 4 and FIG. 5 can achieve the suspension display of higher resolution with less display units.

Figure 6:
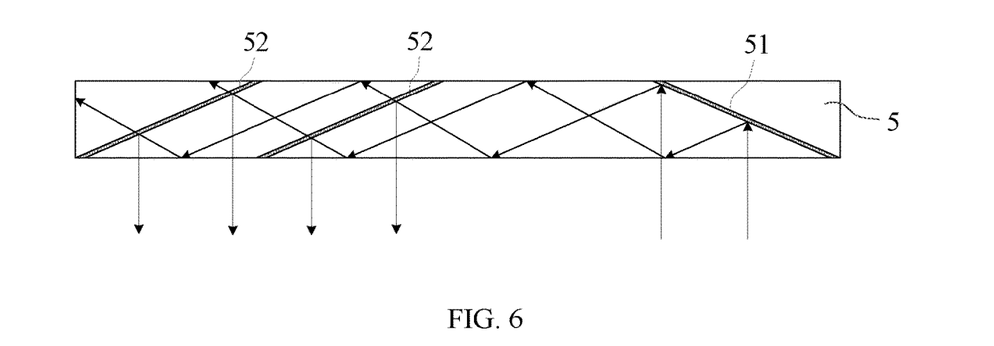
FIG. 6 is a structural schematic diagram of a light waveguide in an embodiment of the present disclosure.

Optionally, as shown in FIG. 6, FIG. 6 is a structural schematic diagram of a light waveguide in an embodiment of the present disclosure. The above light waveguide unit includes at least one light waveguide 5, and the above light waveguide 5 is a micro mirror surface light waveguide.

In the light waveguide 5, an incident light reflective surface 51 and multiple selective reflective surfaces 52 are disposed. The arrows in FIG. 6 are a light path. The light beams from a light source are firstly emitted to the incident light reflective surface 51 after entering the light waveguide 5, such that the light beams are reflected for multiple times in the light waveguide 51 by a total reflection action of the incident light reflective surface 51. The light beams meet the first selective reflective surface 52 after being reflected for multiple times in the light waveguide 5, wherein part of the light rays is reflected by the reflective action of such selective reflective surface 52 and is emergent from the light waveguide 5, and the other part of light rays is transmitted through such selective reflective surface 52, and then meets the second selective reflective surface 52. By a similar action, part of the light rays is reflected by such selective reflective surface 52 and is emergent from the light waveguide 5, and so on. By the actions of the plurality of selective reflective surfaces 52 disposed in the light waveguide 5, the light beams from the light source are expanded to multiple positions to be emergent. Therefore, expansion of the light beams is realized, wherein the selective reflective surfaces can be implemented by corresponding coatings. It should be understood that the light waveguide 5 as shown in FIG. 6 may serve as the light waveguide unit 3 as shown in FIG. 2 and FIG. 3. Alternatively, the light waveguide 5 as shown in FIG. 6 may serve as at least one of the first light waveguide 31 and the second light waveguide 32 as shown in FIG. 4 and FIG. 5.

Figure 7:
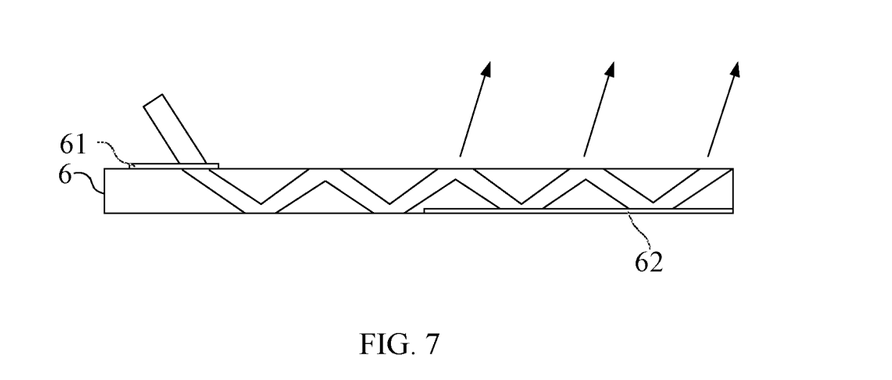
FIG. 7 is a structural schematic diagram of another light waveguide in an embodiment of the present disclosure.

Optionally, as shown in FIG. 7, FIG. 7 is a structural schematic diagram of another light waveguide in an embodiment of the present disclosure. The above light waveguide unit includes at least one light waveguide 6, and the light waveguide 6 is a diffractive waveguide.

In the light waveguide 6, an incident grating 61 and an emergent grating 62 are disposed. Due to a diffraction effect of the incident grating 61, the parallel light beams from the light source are changed in transmission direction so as to meet a total reflection condition and to be transmitted along the light waveguide 6. When the light rays reach the emergent grating 62, the total reflection condition is damaged to cause the parallel light to be emergent. In the meantime, by the emergent grating 62, the light beams from the light source are expanded to multiple positions to be emergent, thereby realizing expansion of the light rays. It should be understood that the light waveguide 6 as shown in FIG. 7 may serve as the light waveguide unit 3 as shown in FIG. 2 and FIG. 3. Or the light waveguide 6 as shown in FIG. 7 may serve as at least one of the first light waveguide 31 and the second light waveguide 32 as shown in FIG. 4 and FIG. 5.

Figure 8:
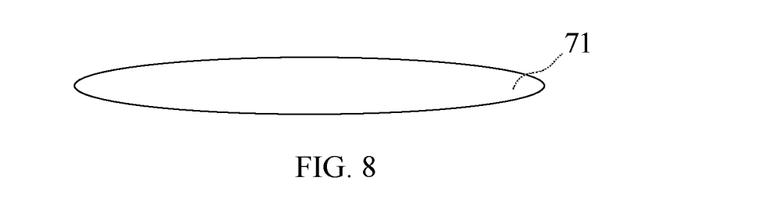
FIG. 8 is a structural schematic diagram of a convex lens.
Figure 9:
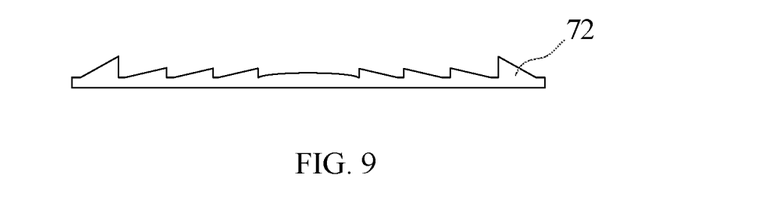
FIG. 9 is a structural schematic diagram of a Fresnel lens.
Figure 10:
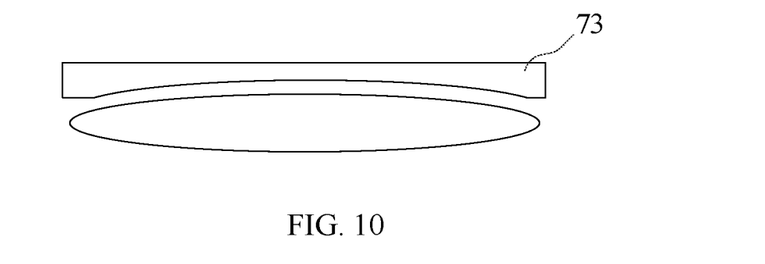
FIG. 10 is a structural schematic diagram of a combination lens.

Optionally, as shown in FIG. 8, FIG. 9 or FIG. 10, FIG. 8 is a structural schematic diagram of a convex lens, FIG. 9 is a structural schematic diagram of a Fresnel lens, and FIG. 10 is a structural schematic diagram of a combination lens. The above collimation unit may be a convex lens 71, a Fresnel lens 72 or a combination lens 73 as long as the emergent light from the display panel can be converted into the parallel light beams of the same direction.

Optionally, as shown in FIG. 8, FIG. 9 or FIG. 10, the above imaging unit may be a combination lens, a Fresnel lens or a convex lens as long as the real image point converged by the emergent light from the light waveguide unit can be displayed.

Figure 11:
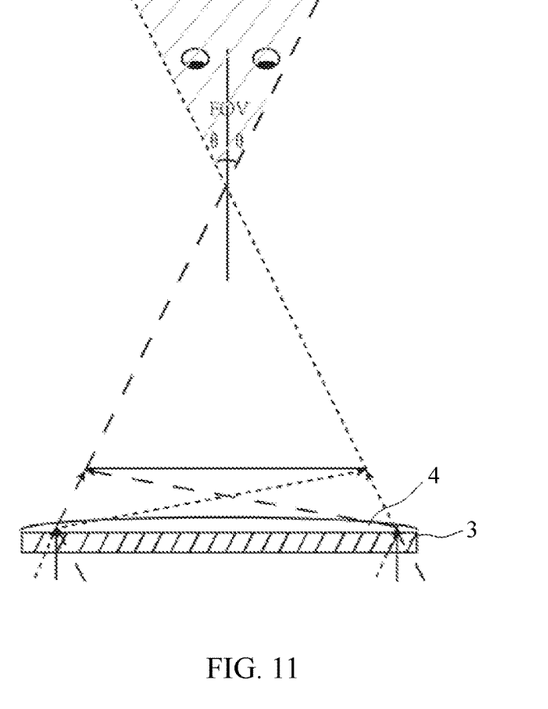
FIG. 11 is a schematic diagram of an imaging principle of an imaging unit in an embodiment of the present disclosure.
Figure 12:
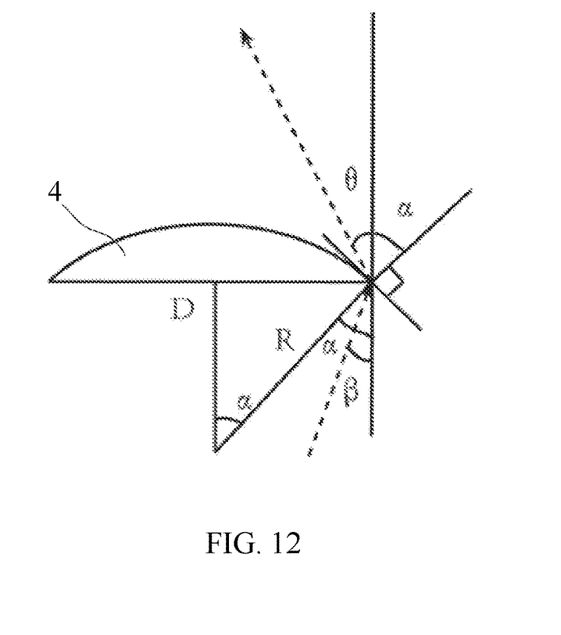
FIG. 12 is an analysis schematic diagram of light rays on the edge of the imaging unit in FIG. 11.

Optionally, as shown in FIG. 11 and FIG. 12, FIG. 11 is a schematic diagram of an imaging principle of an imaging unit in an embodiment of the present disclosure, and FIG. 12 is an analysis schematic diagram of light rays on the edge of the imaging unit in FIG. 11. If the imaging unit 4 is a convex lens, a radius of curvature of the convex lens is smaller than a clear aperture thereof.

In the present embodiment, the imaging unit 4 is the convex lens. The convex lens has a clear aperture, i.e., a diameter of a region of the convex lens that can be transmitted by the light rays. As shown in FIG. 11, the angle of a field of view (FOV) of a suspension display module is $2\theta$, and $2\theta \geq 20°$. If the angle of FOV is too small, then the range of suspension display that can be viewed by human eyes is too small, and product application is difficult. As shown in FIG. 12, a normal included angle between dotted line incident light rays and a lens surface is $\alpha - \beta$. The dotted line incident light rays are emitted after refracted by the lens. A normal included angle between emergent light rays and the lens surface is $\alpha + \theta$, wherein $\theta$ is half angle of the FOV and $\theta \geq 10°$. A refractive index of the lens is n and meets a relational expression $\sin(\alpha + \theta) = n \times \sin(\alpha - \beta)$, wherein $\alpha + \theta < 90°$, and $\beta$ is a divergence angle of the emergent light rays of the light waveguide unit, i.e., a divergence angle of the emergent light of an optical engine. The collimated divergence angle $\beta$ of the light source is usually larger than or equal to 5°. A functional image is drawn according to the relational expressions $\sin(\alpha + \theta) = n \times \sin(\alpha - \beta)$ and $\alpha + \theta < 90°$. It can be determined that $\alpha$ is the minimum value when $\theta = 10°$ and $\beta = 5°$. In the meantime, the above conclusion can also be obtained by analysis of a physical principle. The explanation is as follows: at first, the convex lens imaging unit 4 is configured to converge the incident light. When the $\beta$ is smaller, it is indicated that the convex lens only needs a lower converging capacity, and $\alpha$ is decided by an angle of the lens surface. The angle of the lens surface is related to the converging capacity of the lens, and the smaller $\alpha$ is, the gentler the angle of the lens surface is, and the weaker the converging capacity of the lens is. In addition, $\theta$ is also related to the converging capacity of the lens, and the smaller $\theta$ is, the weaker the converging capacity of the lens is. In conclusion, $\beta$ and $\alpha$ are in positive correlation, and $\theta$ and $\alpha$ are also in positive correlation. Therefore, when $\theta$ is the minimal value 10° and $\beta$ is the minimal value 5°, $\alpha$ is the minimal value. In addition, when n is 1.5, it can be obtained from the above formula that $\alpha \approx 30°$. Therefore, $\alpha > 30°$, and $$\sin\alpha = \frac{D}{2 \times R} > 0.5,$$

wherein D is the clear aperture of the lens, R is radius of curvature of the lens, and D>R. The radius of curvature of the lens needs to be smaller than the clear aperture.

Figure 13:
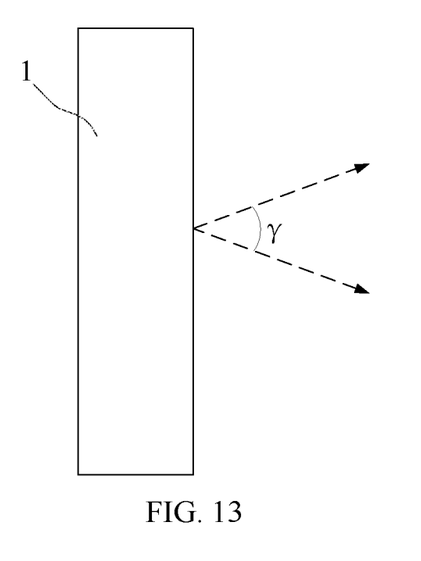
FIG. 13 is a schematic diagram of a light-emitting angle of a display panel in an embodiment of the present disclosure.

Optionally, as shown in FIG. 13, FIG. 13 is a schematic diagram of a light-emitting angle of a display panel in an embodiment of the present disclosure. A maximal light emergent angle $\gamma$ of the display panel 1 is smaller than 30°.

The maximal light emergent angle $\gamma$ is the maximal angle of light beams emitted from certain position on the display panel 1. With the increase of the maximal light emergent angle γ, the light from the display panel 1 is more difficultly emitted to the collimation unit, thereby reducing a use rate of the light. On the contrary, the smaller the maximal light emergent angle γ is, the higher the use rate of the light is. Therefore, the maximal light emergent angle γ of the display panel 1 is set to be smaller than 30°.

The foregoing are merely preferable embodiments of the present disclosure and not intended to limit the present disclosure. Any modifications, equivalent substitutions and improvements made within the spirit and principle of the present disclosure should be contained in the scope of the present disclosure.

It should be finally stated that the above respective embodiments are merely intended for explaining the technical solutions of the present disclosure rather than limiting the same. Although the present disclosure is explained in detail with reference to the respective embodiments mentioned above, those skilled in the art should understand that the technical solutions recorded in the respective embodiments mentioned above can still be modified, or part of or all technical solutions therein can be equivalently substituted, while these modifications or substitutions do not cause the essence of the corresponding technical solutions to depart from the scope of the technical solutions of respective embodiments of the present disclosure.

What is claimed is:

1. A display device, comprising:
   a display panel;
   at least one collimation unit located on a light emergent side of the display panel, wherein each of the at least one collimation unit is configured to collimate emergent light in the same position of the display panel into parallel light beams in the same direction;
   a light waveguide unit located on one side of the at least one collimation unit facing away from the display panel, wherein the light waveguide unit comprises a light incident surface and a light emergent surface, the light incident surface is facing towards the at least one collimation unit, and the light waveguide unit is configured to cause the parallel light beams to be emergent from at least two positions on the light emergent surface; and
   an imaging unit facing towards the light emergent surface of the light waveguide unit, wherein the imaging unit is configured to converge the parallel light beams emergent from the at least two positions of the light emergent surface of the light waveguide unit into a real image point,
   wherein the light waveguide unit comprises a first light waveguide and a second light waveguide, the first light waveguide and the second light waveguide each having a wedge shape;
   the first light waveguide comprises a first light incident surface and a first light emergent surface perpendicular to the first light incident surface, the first light emergent surface has an area larger than that of the first light incident surface, the first light incident surface is facing towards a light emergent side of the at least one collimation unit, and the first light waveguide is configured to cause the parallel light beams emergent from the at least one collimation unit to be emergent from at least two first positions arranged along a first direction at the first light emergent surface;
   the second light waveguide comprises a second light incident surface and a second light emergent surface perpendicular to the second light incident surface, the second light emergent surface has an area larger than that of the second light incident surface, the second light incident surface is facing towards the first light emergent surface, and the second light waveguide is configured to cause the parallel light beams emergent from each of the at least two first positions of the first light waveguide to be emergent from at least two second positions arranged along a second direction at the second light emergent surface; and
   the imaging unit is configured to converge the parallel light beams emergent from each of the at least two second positions of the second light waveguide into the real image point.

2. The display device according to claim 1, wherein
   the display panel comprises a plurality of display units arranged along the first direction;
   the at least one collimation unit comprises a plurality of collimation units corresponding to the plurality of display units in one-to-one correspondence, wherein each of the plurality of collimation units is located on a light emergent side of a corresponding display unit;
   the light waveguide unit is configured to cause the parallel light beams corresponding to each of the plurality of display units to be emergent from at least two positions arranged along the second direction on the light emergent surface; and
   the imaging unit is configured to converge the parallel light beams corresponding to each of the plurality of display units into the real image point.

3. The display device according to claim 1, wherein the light waveguide unit is a micro-mirror surface waveguide.

4. The display device according to claim 1, wherein the light waveguide unit is a diffraction waveguide.

5. The display device according to claim 1, wherein each of the at least one collimation unit is a convex lens, a Fresnel lens or a combination lens.

6. The display device according to claim 1, wherein the imaging unit is a combination lens.

7. The display device according to claim 1, wherein the imaging unit is a Fresnel lens.

8. The display device according to claim 1, wherein the imaging unit is a convex lens.

9. The display device according to claim 8, wherein a radius of curvature of the convex lens is smaller than a clear aperture of the convex lens.

10. The display device according to claim 1, wherein a maximal light emergent angle of the display panel is smaller than 30°.

* * * * *